United States Patent
Kim et al.

(10) Patent No.: US 8,111,283 B2
(45) Date of Patent: Feb. 7, 2012

(54) METHOD AND APPARATUS FOR ENCODING/DECODING VIDEO DATA TO IMPLEMENT LOCAL THREE-DIMENSIONAL VIDEO

(75) Inventors: Dae-sik Kim, Suwon-si (KR); Choon-sik Jung, Hwaseong-si (KR); Suk-ki Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1452 days.

(21) Appl. No.: 11/478,586

(22) Filed: Jul. 3, 2006

(65) Prior Publication Data

US 2007/0002041 A1 Jan. 4, 2007

(30) Foreign Application Priority Data

Jul. 2, 2005 (KR) ........................ 10-2005-0059485

(51) Int. Cl.
*H04N 15/00* (2006.01)
*H04N 9/47* (2006.01)

(52) U.S. Cl. ......................................... 348/43; 348/584
(58) Field of Classification Search .................... 348/43, 348/51, 584; 356/4.01; 544/323; 386/278
See application file for complete search history.

(56) References Cited

U.S. PATENT DOCUMENTS

| 5,644,364 | A | * | 7/1997 | Kurtze et al. | ................ | 348/584 |
| 6,384,821 | B1 | | 5/2002 | Borrel et al. | | |
| 6,741,242 | B1 | | 5/2004 | Itoh et al. | | |
| 7,477,360 | B2 | * | 1/2009 | England et al. | ............. | 356/4.01 |
| 7,756,391 | B1 | * | 7/2010 | Trottier et al. | ............... | 386/278 |
| 2002/0191116 | A1 | | 12/2002 | Kessler et al. | | |
| 2006/0139448 | A1 | * | 6/2006 | Ha et al. | ........................ | 348/51 |

FOREIGN PATENT DOCUMENTS

| JP | 2005-6114 A | 1/2005 |
| JP | 2005-509324 A | 4/2005 |
| KR | 10-2002-0027415 A | 4/2002 |
| KR | 10-2004-0058843 A | 7/2004 |

OTHER PUBLICATIONS

Japanese Office Action issued Sep. 13, 2011 in corresponding Japanese Patent Application No. 2006-183827.

* cited by examiner

*Primary Examiner* — Gims Philippe
(74) *Attorney, Agent, or Firm* — Sughrue Mion, PLLC

(57) ABSTRACT

Provided are a method and apparatus for encoding/decoding video data. The video data decoding method includes decoding a first video stream to generate 2D video data for two-dimensionally displaying video content and decoding a second video stream to generate 3D video data for three-dimensionally displaying at least one part of the display section of the video content.

20 Claims, 9 Drawing Sheets

METHOD AND APPARATUS FOR ENCODING/DECODING VIDEO DATA TO IMPLEMENT LOCAL THREE-DIMENSIONAL VIDEO

CROSS-REFERENCE TO RELATED PATENT APPLICATION

This application claims the benefit of Korean Patent Application No. 10-2005-0059485, filed on Jul. 2, 2005, in the Korean Intellectual Property Office, the disclosure of which is incorporated herein in its entirety by reference.

BACKGROUND OF THE INVENTION

1. Field of the Invention

The present invention relates to a method and apparatus for encoding/decoding video data, and more particularly, to a method and apparatus for encoding/decoding video data according to MPEG (moving picture expert group)-2.

2. Description of the Related Art

With the development of high-definition display devices, there is an increasing demand for viewing two-dimensional (2D) and three-dimensional (3D) video contents, particularly in the fields of advertisement, education, and game industry. Thus, display devices having a 2D/3D switching function and algorithms for converting 2D video data into 3D video data have been developed.

However, since 3D video data is displayed three-dimensionally, its data amount is doubled or its image quality is degraded when compared to 2D video data. Moreover, long-time viewing of 3D video data may cause fatigue or dizziness due to a difference between the displayed 3D video data and an actual 3D image, resulting from current technical limitations. Also, because of problems such as transmission capacity constraints, 3D video enterprises have not yet been launched.

SUMMARY OF THE INVENTION

The present invention provides a method and apparatus for encoding/decoding video data, in which only a specific part of a display section of video content is displayed three-dimensionally to allow the 3D display of the video content to be utilized irrespective of conventional transmission capacity constraints or technical limitations.

An aspect of the present invention provides a video data decoding method. The decoding method includes decoding a first video stream to generate 2D video data for two-dimensionally displaying video content and decoding a second video stream to generate 3D video data for three-dimensionally displaying at least one part of the display section of the video content.

Another aspect of the present invention provides a decoder including a first decoder and a second decoder. The first decoder decodes a first video stream to generate 2D video data for two-dimensionally displaying video content. The second decoder decodes a second video stream to generate 3D video data for three-dimensionally displaying at least one part of the display section of the video content.

Another aspect of the present invention provides a computer-readable recording medium having recorded thereon a program for implementing a video data decoding method on a computer. The video data decoding method includes decoding a first video stream to generate 2D video data for two-dimensionally displaying video content and decoding a second video stream to generate 3D video data for three-dimensionally displaying at least one part of the display section of the video content.

Another aspect of the present invention provides a video data encoding method. The video data encoding method includes encoding 2D video data for two-dimensionally displaying video content to generate a first video stream and encoding 3D video data for three-dimensionally displaying at least one part of the display section of the video content to generate a second video stream.

Another aspect of the present invention provides an encoder including a first encoder and a second encoder. The first encoder encodes 2D video data for two-dimensionally displaying video content to generate a first video stream. The second encoder encodes 3D video data for three-dimensionally displaying at least one part of the display section of the video content to generate a second video stream.

Another aspect of the present invention provides a computer-readable recording medium having recorded thereon a program for implementing a video encoding method on a computer. The video encoding method includes encoding 2D video data for two-dimensionally displaying video content to generate a first video stream and encoding 3D video data for three-dimensionally displaying at least one part of the display section of the video content to generate a second video stream.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
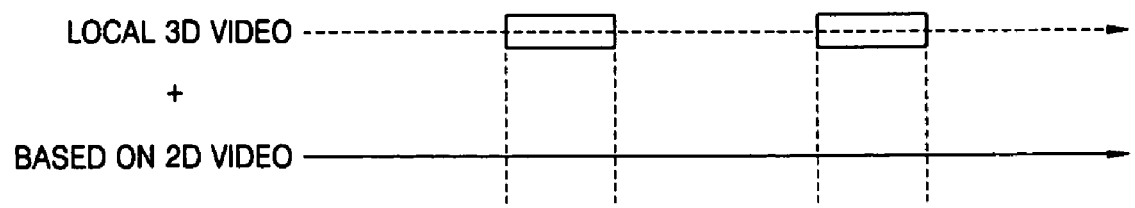
FIG. 1 illustrates an implementation of a local 3D video based on a 2D video according to an exemplary embodiment of the present invention.
Figure 1:
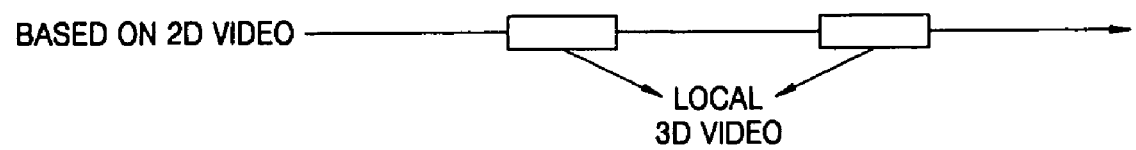

FIG. 1 illustrates an implementation of a local 3D video based on a 2D video according to an exemplary embodiment of the present invention.

Referring to FIG. 1, a local 3D video based on a 2D video may be implemented using two methods as follows.

According to a first method 11, 2D video data for two-dimensionally displaying the entire display section of video content and 3D video data for three-dimensionally displaying at least one part of the display section of the video content are provided.

According to a second method 12, 3D video data for three-dimensionally displaying at least one part of the display section of the video content is provided as in the first method 11, and 2D video data for two-dimensionally displaying the remaining part of the display section of the video content, except for the at least one part displayed three-dimensionally, is provided.

According to the first method 11, the video content can be viewed two-dimensionally using not only an apparatus capable of reproducing both 2D video data and 3D video data but also an apparatus capable of reproducing only 2D video data. However, since 2D video data should be provided for a part of the display section of the video content displayed three-dimensionally, the amount of data transmission increases.

On the other hand, according to the second method 12, 2D video data is not required for a part of the display section of the video content displayed three-dimensionally, thereby reducing the amount of data transmission. However, the video content can be viewed only using an apparatus capable of reproducing both 2D video data and 3D video data.

As mentioned above, by three-dimensionally displaying only a specific part of the display section of video content to be highlighted by a video content producer, a viewer can get a strong impression of the specific part displayed three-dimensionally. Through the application of such three-dimensional display to the fields of advertisement, education, and game industry, more efficient effects can be obtained.

In addition, the amount of data transmission can be greatly reduced when compared to a conventional method in which the entire display section of video content is provided in the form of 3D video data.

Figure 2:
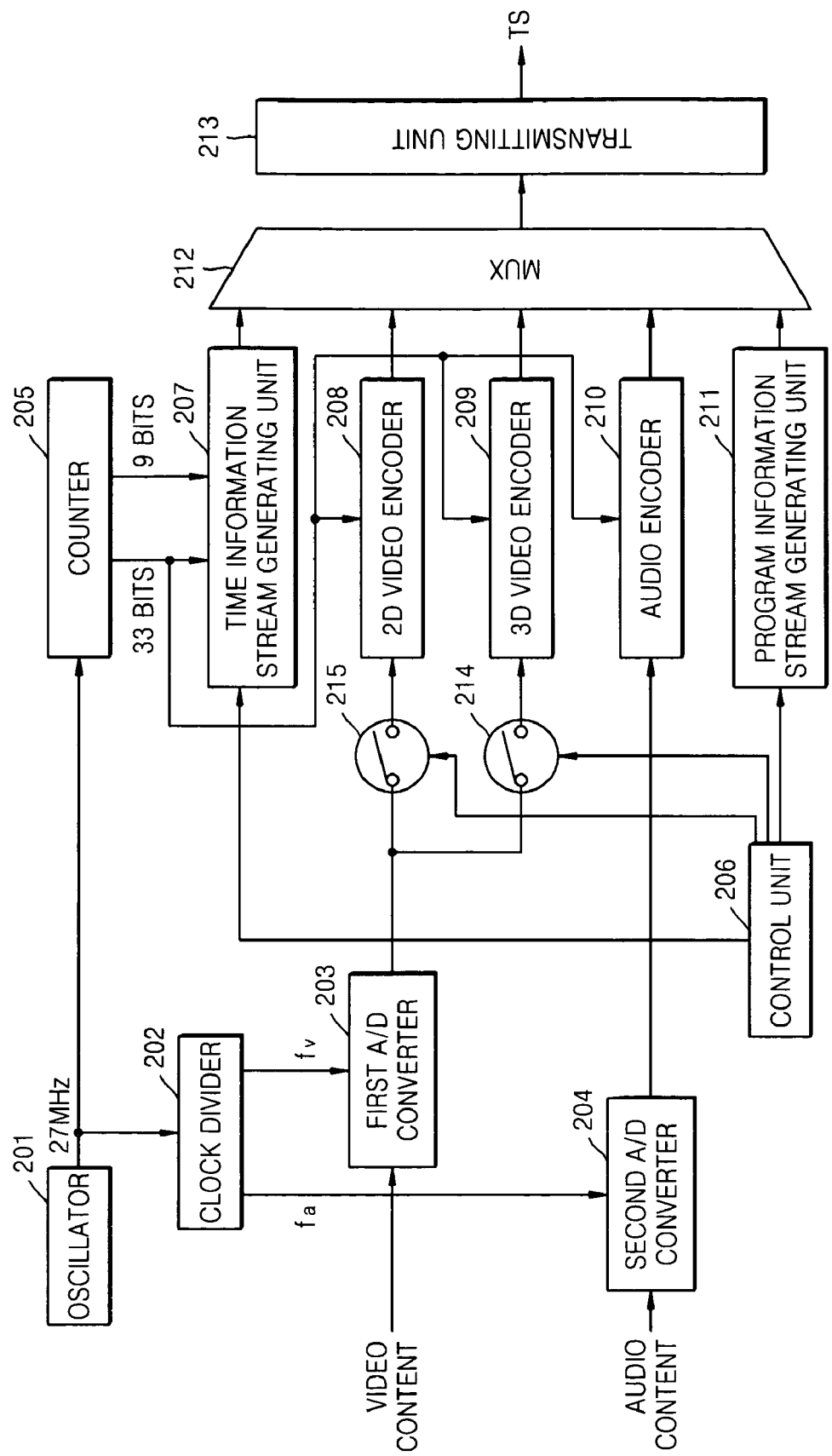
FIG. 2 is a block diagram of an MPEG (moving picture expert group)-2 encoder according to an exemplary embodiment of the present invention.

FIG. 2 is a block diagram of an MPEG-2 encoder according to an exemplary embodiment of the present invention.

Referring to FIG. 2, an MPEG-2 encoder may include an oscillator 201, a clock divider 202, a first analog-to-digital(A/D) converter 203, a second A/D converter 204, a counter 205, a control unit 206, a time information stream generating unit 207, a 2D video encoder 208, a 3D video encoder 209, an audio encoder 210, a program information stream generating unit 211, a multiplexer (MUX) 212, and a transmitting unit 213.

The oscillator 201 may generate an about 27 MHz master clock signal.

The clock divider 202 divides The 27 MHz master clock signal generated by the oscillator 201 to generate a video clock signal and an audio clock signal.

The first A/D converter 203 converts analog video data corresponding to the original video content into digital video data according to the video clock signal generated by the clock divider 202.

The second A/D converter 204 converts analog audio data corresponding to the original audio content into digital audio data according to the audio clock signal generated by the clock divider 202.

The counter 205 may increase a count value by 1 up to 42 bits in response to the 27 MHz master clock signal generated by the oscillator 201, and thereby may generate an about 90 KHz clock signal and an about 27 KHz clock signal. The counter 205 may obtain the 90 KHz clock signal from a count value corresponding to upper 33 bits of a 42-bit count value and the 27 KHz clock signal from a count value corresponding to lower 9 bits of the 42-bit count value.

The control unit 206 may control the 3D video encoder 209 to encode at least one part of the display section of the video content. The control unit 206 may control a switch 214 connecting the first A/D converter 203 and the 3D video encoder 209 to transfer only digital video data corresponding to at least one part of the display section of the video content among digital video data obtained through the conversion of the first A/D converter 203 to the 3D video encoder 209.

The control unit 206 also may control the 2D video encoder 208 to encode the entire display section of the video content or the remaining part of the display section of the video content except for the at least one part three-dimensionally encoded. In other words, the control unit 206 may control a switch 215 connecting the first A/D converter 203 to the 2D video encoder 208 to output digital video data corresponding to the entire display section of the video content among digital video data obtained through the conversion of the first A/D converter 203 to the 2D video encoder 208, or the control unit 206 may control the switch 215 connecting the first A/D converter 203 to the 2D video encoder 208 to send digital video data corresponding to the remaining part of the display section of the video content except for the at least one part three-dimensionally encoded among digital video data obtained through the conversion of the first A/D converter 203 to the 2D video encoder 208.

The time information stream generating unit 207 may generate a time information stream indicating time information that allows streams generated by the 2D video encoder 208, the 3D video encoder 209, and the audio encoder 210 to be decoded by an MPEG-2 decoder at appropriate instants of time based on control information of the control unit 206. The time information stream generating unit 207 may generate a time information stream indicating time information about a part of the display section of the video content displayed three-dimensionally.

Figure 3:
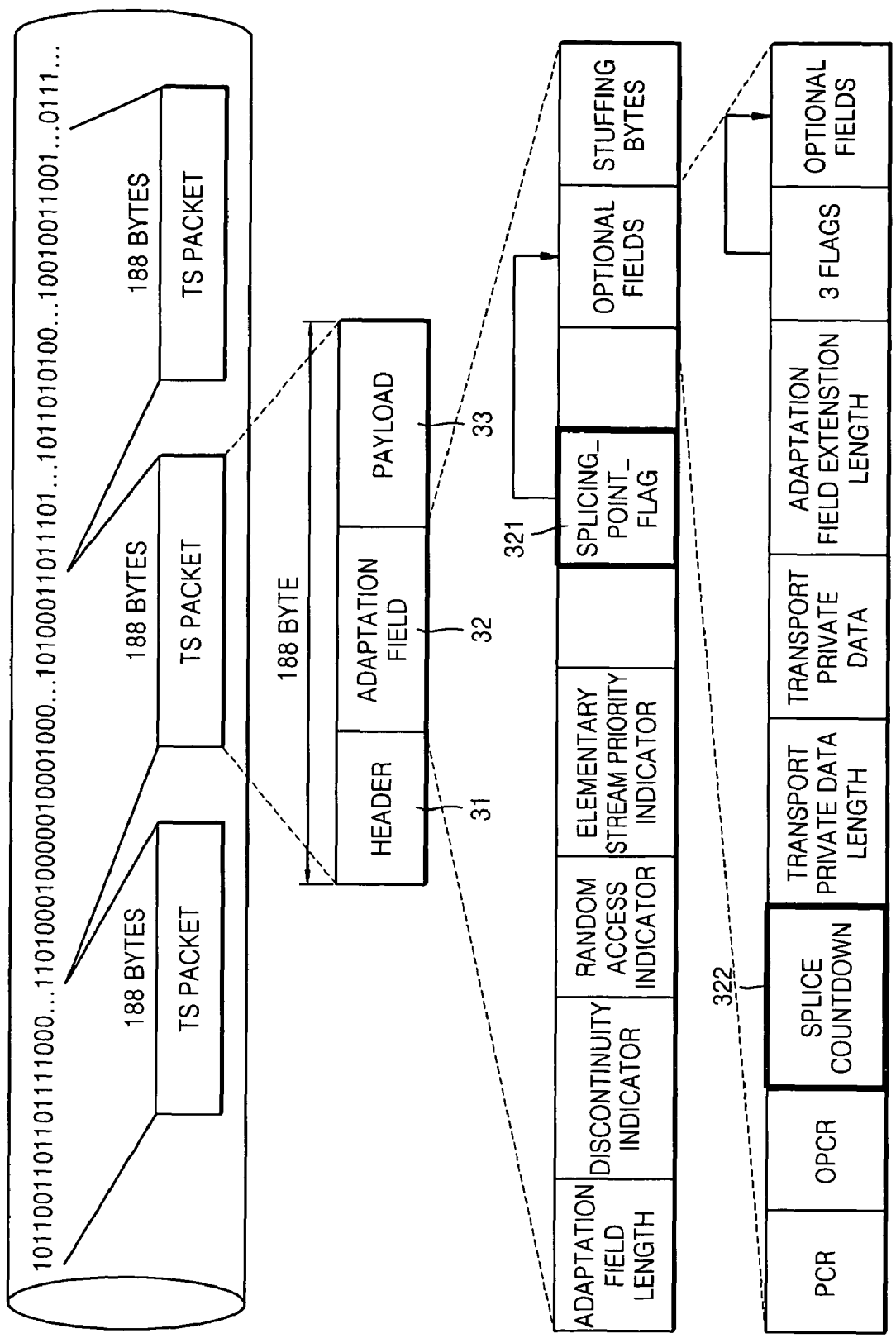
FIG. 3 illustrates the format of a transport stream according to an exemplary embodiment of the present invention.

FIG. 3 illustrates the format of a transport stream according to an exemplary embodiment of the present invention.

Referring to FIG. 3, a transport stream may include a plurality of transport stream packets (hereinafter, referred to as TS packets), each of which has a length of 188 bytes. Each of the TS packets may include a header 31, an adaptation field 32, and a payload 33.

The adaptation field 32 may include a plurality of fields as shown in FIG. 3. A splicing_point _flag 321 and a splice_countdown 322 may be used to indicate time information about a part of the display section of the video content displayed three-dimensionally. The splicing_point _flag 321 may be used to indicate switching of the displayed dimension of the video content. Also, the splice_countdown 322 may be used to indicate a 3D display start point that indicates the start of a part of the display section of the video content displayed three-dimensionally, and a 2D display start point that indicates the end of the part of the display section of the video content displayed three-dimensionally.

Time information may include the splicing_point _flag 321, the splice_countdown 322, and time information according to MPEG-2 such as a program clock reference (PCR), a presentation time stamp (PTS), and a deciding time stamp (DTS). The PCR may be an about 27 MHz clock sample for synchronizing the MPEG-2 encoder and the MPEG-2 decoder, the PTS may be a time stamp for controlling a time point when video content is displayed, and the DTS may be a time stamp for controlling a time point when video content is decoded.

The 2D video encoder 208 encodes 2D video data for two-dimensionally displaying the video content among digital video data obtained through the conversion of the first A/D converter 203 in synchronization with the 90 KHz clock signal generated by the counter 205, thereby generating a 2D video stream. The 2D video encoder 208 extracts 2D video data applied in the same manner as human right and left eyes from the digital video data obtained through the conversion of the first A/D converter 203 and encodes the extracted 2D video data.

In particular, when the first method 11 shown in FIG. 1 is used, the 2D video encoder 208 encodes 2D video data for two-dimensionally displaying the entire display section of the video content. When the second method 12 shown in FIG. 1 is used, the 2D video encoder 208 encodes 2D video data for two-dimensionally displaying the remaining part of the display section of the video content except for a part of the display section of the video content displayed three-dimensionally.

The 3D video encoder 209 encodes 3D video data for three-dimensionally displaying the video content among digital video data obtained through the conversion of the first A/D converter 203 in synchronization with the 90 KHz clock signal generated by the counter 205, thereby generating a 3D video stream. The 2D video encoder 208 may extract video data for the right eye and video data for the left eye from the digital video data obtained through the conversion of the first A/D converter 203 and encode the extracted video data.

The audio encoder 210 encodes digital audio data obtained through the conversion of the second A/D converter 204 in synchronization with the 90 KHz clock signal generated by the counter 205, thereby generating an audio stream.

The program information stream generating unit 211 may generate a program information stream indicating program information that allows streams generated by the 2D video encoder 208, the 3D video encoder 209, and the audio encoder 210 to be identified as a program by the MPEG-2 decoder based on the control information of the control unit 206. In particular, the program information stream generating unit 211 may generate a program information stream indicating program information about a part of the display section of the video content displayed three-dimensionally.

Figure 4:
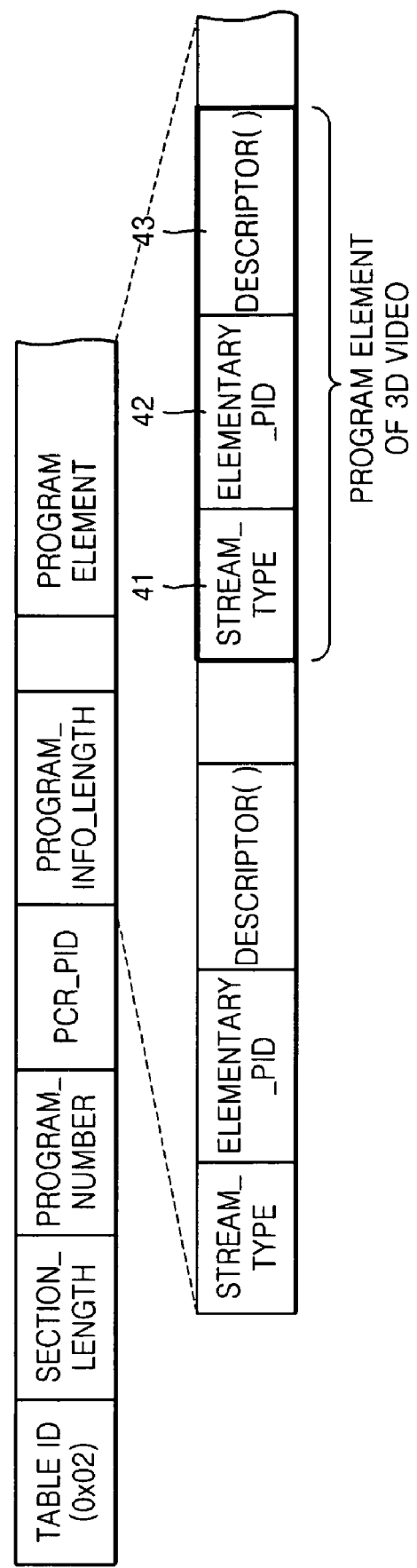
FIG. 4 illustrates the format of a program map table according to an exemplary embodiment of the present invention.

FIG. 4 illustrates the format of a program map table according to an exemplary embodiment of the present invention.

Referring to FIG. 4, a program map table may include a plurality of fields. A program element field, particularly a stream type 41, an elementary packet identification (PID) 42, and a descriptor 43 may be used to indicate program information about a part of the display section of the video content displayed three-dimensionally.

The stream type 41 may be used to indicate the type of a program element of a part of the display section of the video content displayed three-dimensionally, the elementary PID 42 may be used to indicate the PID of TS packets of 3D video data corresponding to the part of the display section of the video content displayed three-dimensionally, and the descriptor 43 may be used to indicate description information about 3D video data.

In other words, the program information may include the stream type 41, the elementary PID 42, the descriptor 43, and program specific information (PSI) and program and system information protocol (PSIP) according to MPEG-2. Since the transport stream may include a video stream and an audio stream corresponding to a plurality of programs, information about how to encode packets corresponding to one of the plurality of programs is required. Such information may be the PSI. The PSIP is a digital TV broadcasting standard established by the Advanced Television System Committee (ATSC) and includes channel information, program information, and system information for digital TV broadcasting.

The MUX 212 multiplexes the 2D video stream generated by the 2D video encoder 208, the 3D video stream generated by the 3D video encoder 209, the audio stream generated by the audio encoder 210, the time information stream generated by the time information stream generating unit 207, and the program information stream generated by the program information stream generating unit 208, thereby generating a transport stream.

The transmitting unit 213 transmits the transport stream generated by the MUX 212 to the MPEG-2 decoder.

Figure 5:
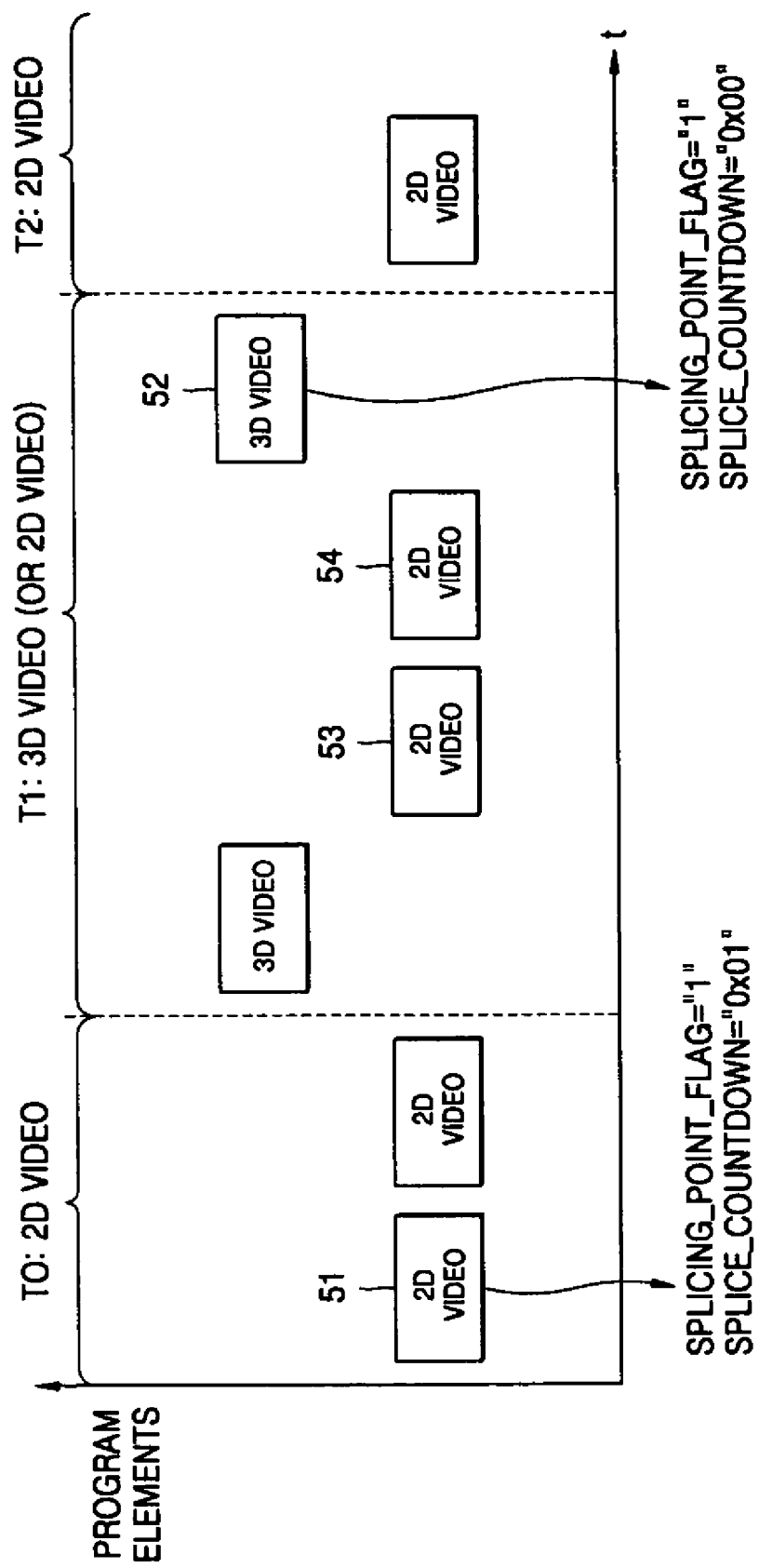
FIG. 5 is a timing diagram for the display of video content according to an exemplary embodiment of the present invention.

FIG. 5 is a timing diagram for the display of video content according to an exemplary embodiment of the present invention.

Referring to FIG. 5, the timing for the display of the video content may be implemented with a transport stream transmitted from the MPEG-4 encoder shown in FIG. 4. In FIG. 5, a horizontal axis indicates the display section of the video content, and a vertical axis indicates program elements of the transport stream.

First, T0 is a part of the display section of the video content displayed two-dimensionally. At least one packet 51 among TS packets reproduced during T0 has the splicing_point_flag 321 where a value indicating switching of the displayed dimension of the video content, i.e., "1," is recorded and the splice_countdown 322 where a value indicating the start of a part of the display section of the video content displayed three-dimensionally, i.e., the number of TS packets remaining until the arrival of a TS packet including a 3D video stream, is recorded. The MPEG-2 decoder switches 2D display to 3D display at an accurate time point by referring to the splicing_point_flag 321 and the splice_countdown 322.

Next, T1 is a part of the display section of the video content displayed three-dimensionally. At least one packet 52 among TS packets reproduced during T1 has the splicing_point_flag 321 where a value indicating switching of the displayed dimension of the video content, i.e., "1," is recorded and the splice_countdown 322 where a value indicating the end of a part of the display section of the video content displayed three-dimensionally, i.e., the number of TS packets remaining until the arrival of a TS packet including a 2D video stream, is recorded. The MPEG-2 decoder switches 3D display to 2D display at an accurate time point by referring to the splicing_point_flag 321 and the splice_countdown 322. However, during T1, to allow an apparatus capable of reproducing only 2D video data to reproduce the video content, TS packets 52 and 53 including a 2D video stream may be provided.

Figure 6:
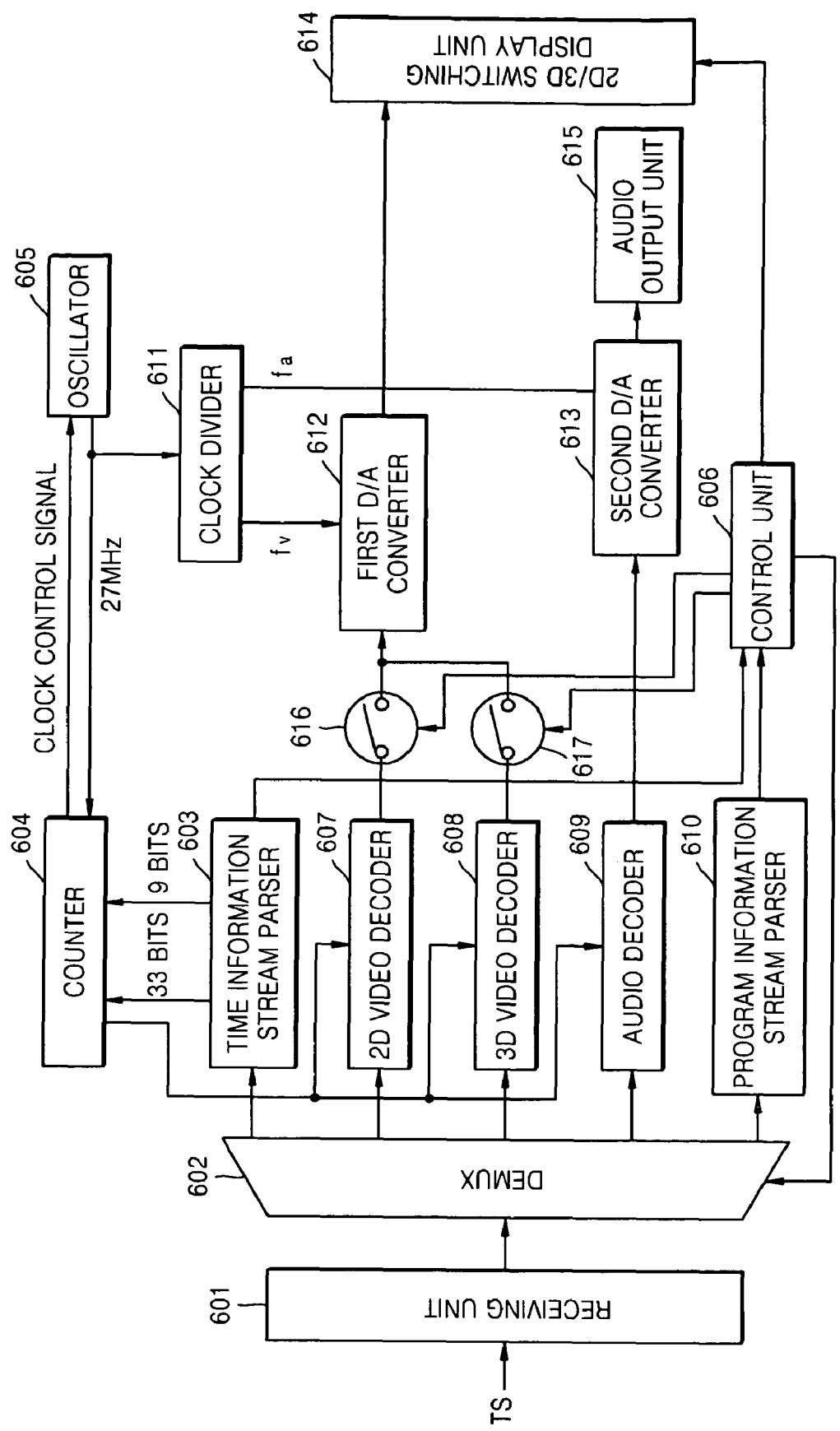
FIG. 6 is a block diagram of an MPEG-2 decoder according to an exemplary embodiment of the present invention.

FIG. 6 is a block diagram of an MPEG-2 decoder according to an exemplary embodiment of the present invention.

Referring to FIG. 6, an MPEG-2 decoder may include a receiving unit 601, a demultiplexer (DEMUX) 602, a time information stream parser 603, a counter 604, an oscillator 605, a control unit 606, a 2D video decoder 607, a 3D video decoder 608, an audio decoder 609, a program information stream parser 610, a clock divider 611, a first digital-to-analog (D/A) converter 612, a second D/A converter 613, and a 2D/3D switching display unit 614.

The receiving unit 601 receives a transport stream from the MPEG-2 encoder shown in FIG. 2.

The DEMUX 602 demultiplexes the transport stream received by the receiving unit 601 to extract a 2D video stream, a 3D video stream, an audio stream, a time information stream, and a program information stream.

The time information stream parser 603 parses the time information stream extracted by the DEMUX 602 to generate time information that allows the streams extracted by the DEMUX 602 to be decoded at appropriate instants of time by the MPEG-2 decoder. The time information stream parser 603 may generate time information about a part of the display section of the video content displayed three-dimensionally. As mentioned above, the time information may include the splicing_point _flag 321 indicating switching of the displayed dimension of the video content, the splice_countdown 322 indicating a 2D display start point of the video content, the splice_countdown 322 indicating a 3D display start point of the video content, and time information according to MPEG-2 such as the PCR, the PTS, and the DTS.

The counter 604 may output a clock control signal for synchronizing the MPEG-2 encoder and the MPEG-2 decoder to the oscillator 605 by referring to the PCR generated by the time information stream parser 603. In addition, the counter 604 may increase a count value by 1 up to 42 bits in response to the about 27 MHz master clock signal generated by the oscillator 605, and thereby may generate an about 90 KHz clock signal and an about 27 KHz clock signal. The counter 205 obtains the 90 KHz clock signal from a count value corresponding to upper 33 bits of a 42-bit count value and the 27 KHz clock signal from a count value corresponding to lower 9 bits of the 42-bit count value.

The oscillator 605 may generate an about 27 MHz master clock signal according to the clock control signal output from the counter 604.

The control unit 606 controls 2D video data generated by the 2D video decoder 607 or 3D video data generated by the 3D video decoder 608 to be output by referring to the time information generated by the time information stream parser 603. The control unit 605 may control a switch 616 connecting the 2D video decoder 607 to the first D/A converter 612 by referring to the splicing_point _flag 321 and the splice_countdown 322 among the time information generated by the time information stream parser 603 to output the 2D video data generated by the 2D video decoder 607 for a part of the display section of the video content displayed two-dimensionally and may control a switch 617 connecting the 3D video decoder 608 and the first D/A converter 612 by referring to the splicing_point _flag 321 and the splice_countdown 322 among the time information generated by the time information stream parser 603 to output the 3D video data generated by the 3D video decoder 608 for a part of the display section of the video content displayed three-dimensionally.

The control unit 606 may output a 2D/3D switch control signal used for the 2D/3D switching display unit 614 to control 2D/3D switching by referring to the splicing_point _flag 321 and the splice_countdown 322 among the time information generated by the time information stream parser 603.

The control unit 606 controls the 2D video decoder 607 to decode the entire display section of the video content or the remaining part of the display section of the video content except for the part of the display section of the video content displayed three-dimensionally. In other words, the control unit 606 may control a switch 616 connecting the 2D video decoder 607 to the first D/A converter 612 to output 2D video data obtained through the decoding of the 2D video decoder 607 to the first D/A converter 612 for the entire display section of the video content, or the control unit 606 may control the switch 616 connecting the 2D video decoder 607 to the first D/A converter 612 to output 2D video data obtained through the decoding of the 2D video decoder 607 to the first D/A converter 612 for the remaining part of the display section of the video content except for the part of the display section of the video content displayed three-dimensionally.

The control unit 606 controls demultiplexing of the DEMUX 602 to extract 2D video data, 3D video data, and audio data corresponding to a plurality of programs from a transport stream by referring to program information generated by the program information stream parser 610. The control unit 606 controls demultiplexing of the DEMUX 602 to separately extract 3D video data by referring to the type of a program element of a part of the display section of the video content displayed three-dimensionally, the PID of TS packets of the 3D video data, and description information about the 3D video data among the time information generated by the program information stream parser 610.

The 2D video decoder 607 decodes a 2D video stream extracted by the DEMUX 602 in synchronization with the 90 KHz clock signal generated by the counter 604, thereby generating 2D video data for displaying video content two-dimensionally.

In particular, when the first method 11 shown in FIG. 1 is used, the 2D video decoder 607 generates 2D video data for two-dimensionally displaying the entire display section of the video content. When the second method 12 shown in FIG. 1 is used, the 2D video decoder 607 generates 2D video data for two-dimensionally displaying the remaining part of the display section of the video content except for a part of the display section of the video content displayed three-dimensionally.

The 3D video decoder 608 decodes a 3D video stream extracted by the DEMUX 602 in synchronization with the 90 KHz clock signal generated by the counter 604, thereby generating 3D video data for three-dimensionally displaying at least one part of the display section of the video content.

The audio decoder 609 decodes an audio stream extracted by the DEMUX 602 in synchronization with the 90 KHz clock signal generated by the counter 604, thereby generating audio data.

The program information stream parser 610 parses the program information stream extracted by the DEMUX 602, thereby generating program information that allows 2D video data, 3D video data, and audio data included in a transport stream to be identified as a program by the MPEG-2 decoder. The program information stream parser 610 generates program information about a part of the display section of the video content displayed three-dimensionally.

As mentioned above, the program information includes the stream type indicating the type of a program element of a part of the display section of the video content displayed three-dimensionally, the elementary PID 42 indicating the PID of TS packets of the 3D video data corresponding to the part of the display section of the video content displayed three-dimensionally, the descriptor 43 indicating description information about the 3D video data, and the PSI and the PSIP according to MPEG-2.

The clock divider 611 divides the 27 MHz master clock signal generated by the oscillator 605, thereby generating a video clock signal and an audio clock signal.

The first D/A converter 612 converts 2D video data generated by the 2D video decoder 607 or 3D video data generated by the 3D video decoder 608 into analog video data according to the video clock signal generated by the clock divider 611.

The second D/A converter 612 converts audio data generated by the audio decoder 609 into analog audio data according to the audio clock signal generated by the clock divider 611.

The 2D/3D switching display unit 614 two-dimensionally or three-dimensionally displays the analog video data obtained through the conversion of the first D/A converter 612 according to the 2D/3D switching control signal output from the control unit 606.

Figure 7:
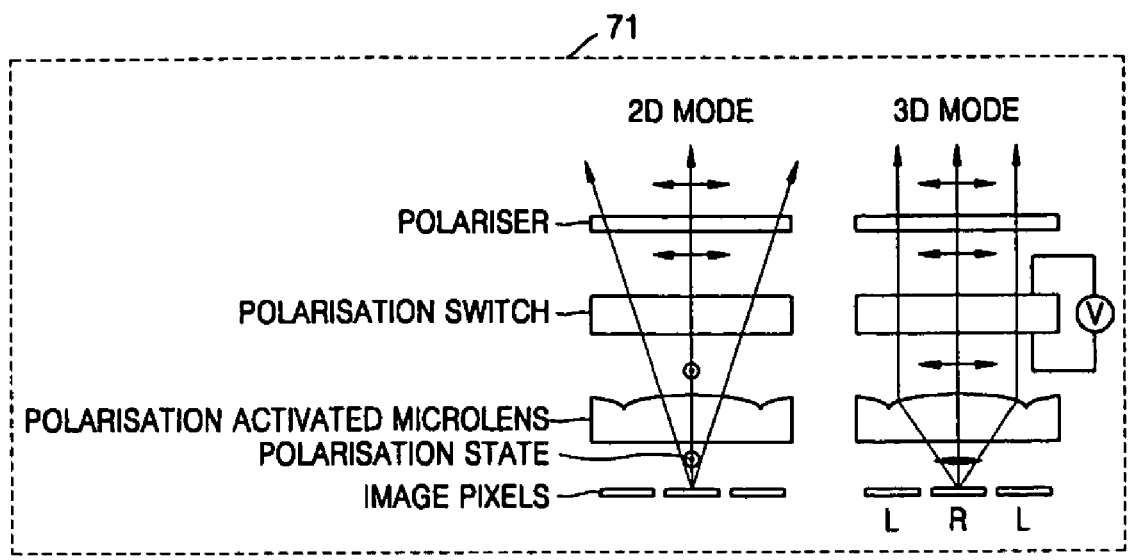
FIG. 7 illustrates 2D/3D switching display methods applicable to an exemplary embodiment of the present invention.
Figure 7:
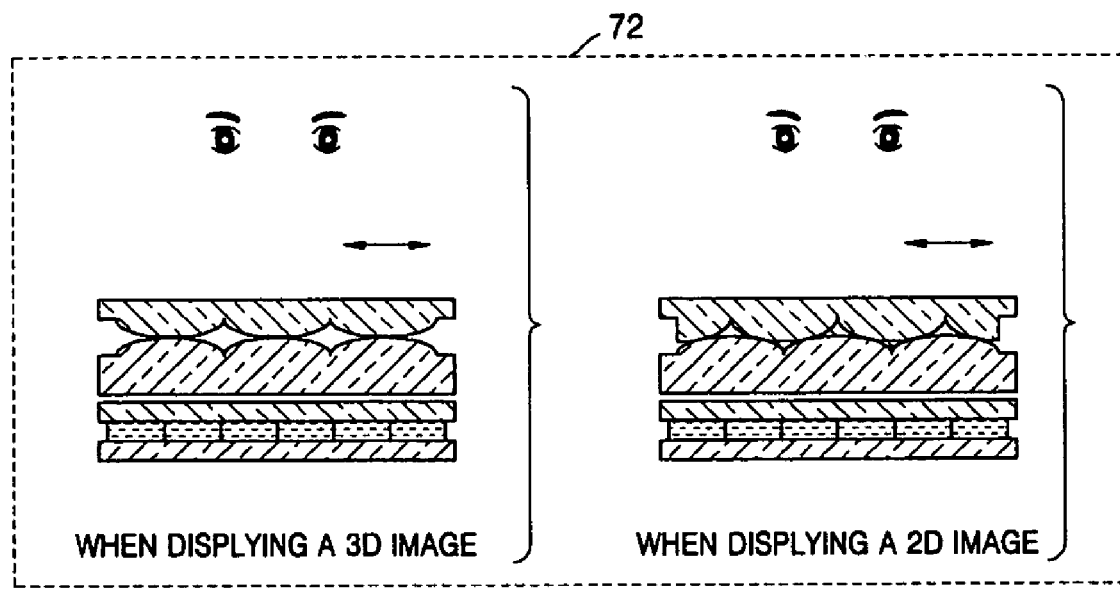

FIG. 7 illustrates 2D/3D switching display methods applicable to an exemplary embodiment of the present invention.

Referring to FIG. 7, a first method 71 among the 2D/3D switching display methods electrically performs 2D/3D switching. When the 2D/3D switching display unit 614 applies a voltage to a polarization switch at the start point of a part of the display content of the video content displayed three-dimensionally according to the 2D/3D switching control signal output from the control unit 606 for the 2D/3D switching display unit 614, among analog video data obtained through the conversion of the first D/A converter 612, video data applied to for the right eye converges to the right eye and video data for the left eye converges to the left eye due to polarization. This first method 71 is disclosed in detail in British Patent No. GB 2000129992 titled "Control of Optical Switching Apparatus".

A second method 72 among the 2D/3D switching display methods mechanically performs 2D/3D switching. The 2D/3D switching display unit 614 horizontally moves an upper lens at the start point of a part of the display content of the video content displayed three-dimensionally according to the 2D/3D switching control signal output from the control unit 606 for the 2D/3D switching display unit 614, among analog video data obtained through the conversion of the first D/A converter 612, video for the right eye converges to the right eye and video data for the left eye converges to the left eye due to a refraction difference. This second method 72 is disclosed in detail in European Patent No. EP 1394593 titled "3D Image/2D Image Switching Display Apparatus and Portable Terminal Device".

It can be understood by those skilled in the art that 2D/3D switching can be performed using other methods in addition to the 2D/3D switching display methods 71 and 72.

The audio output unit 615 outputs analog audio data obtained through the conversion of the second D/A converter 613.

Figure 8:
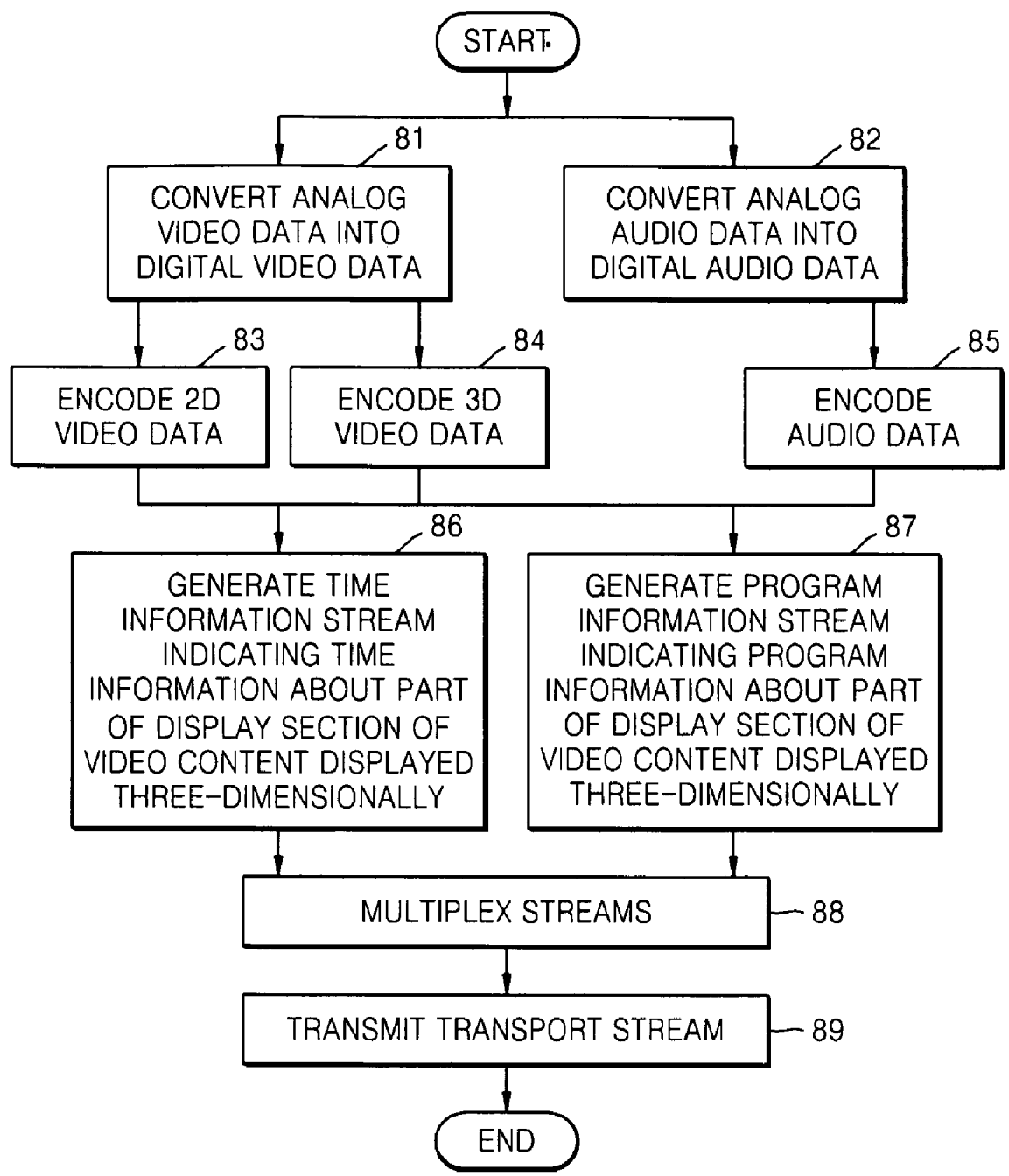
FIG. 8 is a flowchart illustrating an MPEG-2 encoding method an exemplary embodiment of the present invention.

FIG. 8 is a flowchart illustrating an MPEG-2 encoding method according to an exemplary embodiment of the present invention.

Referring to FIG. 8, an MPEG-2 encoding method may include the following operations. The MPEG-2 encoding method includes operations processed in time series by the MPEG-2 encoder shown in FIG. 2. Thus, although not given in the following description, a description that is already made about the MPEG-2 encoder is also applied to the MPEG-2 encoding method.

In operation 81, the MPEG-2 encoder converts analog video data corresponding to the original video content into digital video data.

In operation 82, the MPEG-2 encoder converts analog audio data corresponding to the original audio content into digital audio data.

In operation 83, the MPEG-2 encoder encodes 2D video data for two-dimensionally displaying the video content among the digital video data obtained through the conversion of operation 81, thereby generating a 2D video stream. When the first method 11 shown in FIG. 1 is used, the MPEG-2 encoder encodes 2D video data for two-dimensionally displaying the entire display section of the video content in operation 83. When the second method 11 shown in FIG. 1 is used, the MPEG-2 encoder encodes 2D video data for two-dimensionally displaying the remaining part of the display section of the video content except for a part of the display section of the video content displayed three-dimensionally in operation 83.

In operation 84, the MPEG-2 encoder encodes 3D video data for three-dimensionally displaying the video content among the digital video data obtained through the conversion of operation 81, thereby generating a 3D video stream.

In operation 85, the MPEG-2 encoder encodes the digital audio data obtained through the conversion of operation 81, thereby generating an audio stream.

In operation 86, the MPEG-2 encoder generates a time information stream indicating time information that allows the streams generated in operations 83 through 85 to be decoded at appropriate time points by the MPEG-2 decoder. The MPEG-2 encoder generates a time information stream indicating time information about a part of the display section of the video content displayed three-dimensionally in operation 86.

In operation 87, the MPEG-2 encoder generates a program information stream indicating program information that allows the streams generated in operations 83 through 85 to be identified as programs. The MPEG-2 encoder generates a program information stream indicating program information about a part of the display section of the video content displayed three-dimensionally in operation 87.

In operation 88, the MPEG-2 encoder multiplexes the 2D video stream generated in operation 83, the 3D video stream generated in operation 84, the audio stream generated in operation 85, the time information stream generated in operation 86, and the program information stream generated in operation 87, thereby generating a transport stream.

In operation 89, the MPEG-2 encoder transmits the transport stream generated in operation 88 to the MPEG-2 decoder.

Figure 9:
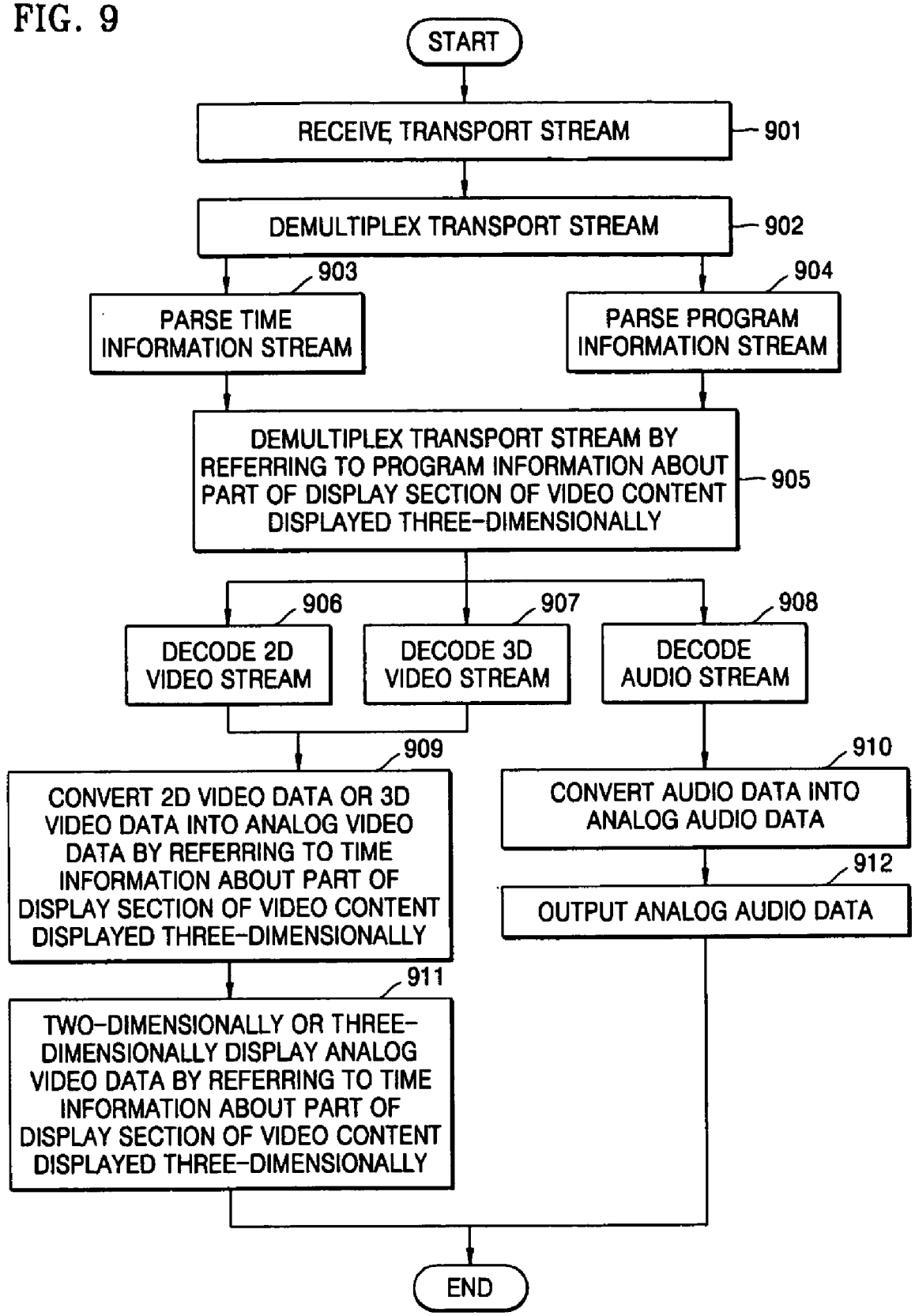
FIG. 9 is a flowchart illustrating an MPEG-2 decoding method an exemplary embodiment of the present invention.

FIG. 9 is a flowchart illustrating an MPEG-2 decoding method according to an exemplary embodiment of the present invention.

Referring to FIG. 9, an MPEG-2 decoding method may include the following operations. The MPEG-2 decoding method includes operations processed in time series by the MPEG-2 decoder shown in FIG. 6. Thus, although not given in the following description, a description that is already made about the MPEG-2 decoder is also applied to the MPEG-2 decoding method.

In operation 901, the MPEG-2 decoder receives a transport stream from the MPEG-2 encoder.

In operation 902, the MPEG-2 decoder demultiplexes the transport stream received in operation 901 to extract a time information stream and a program information stream.

In operation 903, the MPEG-2 decoder parses the time information stream extracted in operation 902 to generate time information that allows the streams extracted in operation 902 to be decoded at appropriate time points by the MPEG-2 decoder. The MPEG-2 decoder generates time information about a part of the display section of the video content displayed three-dimensionally in operation 903.

In operation 904, the MPEG-2 decoder parses the program information stream extracted in operation 902 to generate program information that allows 2D video data, 3D video data, and audio data included in the transport stream to be identified as programs. The MPEG-2 decoder generates program information about a part of the display section of the video content displayed three-dimensionally in operation 904.

In operation 905, the MPEG-2 decoder demultiplexes the transport stream received in operation 901 by referring to the program information about the part of the display section of the video content displayed three-dimensionally generated in operation 904, to extract a 2D video stream, a 3D video stream, and an audio stream.

In operation 906, the MPEG-2 decoder decodes the 2D video stream extracted in operation 905, thereby generating 2D video data for two-dimensionally displaying the video content. When the first method 11 shown in FIG. 1 is used, the MPEG-2 decoder generates 2D video data for two-dimensionally displaying the entire display section of the video content in operation 906. When the second method 12 shown in FIG. 1 is used i, the MPEG-2 decoder generates 2D video data for two-dimensionally displaying the remaining part of the display section of the video content except for a part of the display section of the video content displayed three-dimensionally in operation 906.

In operation 907, the MPEG-2 decoder decodes the 3D video stream extracted in operation 905, thereby generating 3D video data for three-dimensionally displaying at least one part of the display section of the video content.

In operation 908, the MPEG-2 decoder decodes the audio stream extracted in operation 905, thereby generating audio data.

In operation 909, the MPEG-2 decoder converts the 2D video data generated in operation 904 or the 3D video data extracted in operation 905 into analog video data by referring to the time information about the part of the display section of the video content displayed three-dimensionally among the time information generated in operation 903.

In operation 910, the MPEG-2 decoder converts the audio data generated in operation 908 into analog audio data.

In operation 911, the MPEG-2 decoder two-dimensionally or three-dimensionally displays the analog video data obtained in operation 909 by referring to the time information about the part of the display section of the video content displayed three-dimensionally among the time information generated in operation 903.

In operation 912, the MPEG-2 decoder outputs the analog audio data generated in operation 910.

According to aspects of the present invention, only a specific part of the display section of video content to be highlighted by a video content producer is displayed three-dimensionally, thereby allowing a viewer of the video content to get a strong impression of the specific part displayed three-dimensionally. Through the application of such three-dimensional display to the fields of advertisement, education, and game industry, more efficient effects can be obtained.

Moreover, according to aspects of the present invention, since only a specific part of the display section of the video content is displayed three-dimensionally, 3D display of the video content can be fully utilized irrespective of conventional transmission capacity constraints or technical limitations.

Exemplary embodiments of the present invention can be embodied as a program that can be implemented on computers and embedded devices and can be implemented on general-purpose digital computers executing the program using recording media that can be read by computers and embedded devices. In addition, a data structure used in an exemplary embodiment of the present invention can be recorded on a computer-readable recording medium by various means.

Examples of the recording media include, but are not limited to, magnetic storage media such as read-only memory (ROM), floppy disks, and hard disks, optical data storage devices such as CD-ROMs and digital versatile discs (DVD), and carrier waves such as transmission over the Internet.

While the present invention has been shown and described with reference to exemplary embodiments thereof, it will be understood by those of ordinary skill in the art that various changes in form and details may be made therein without departing from the spirit and scope of the present invention as defined by the following claims.

What is claimed is:

1. A video data decoding method comprising:
   (a) decoding a first video stream to generate 2D video data for two-dimensionally displaying video content;
   (b) decoding a second video stream to generate 3D video data for three-dimensionally displaying at least one part of the display section during which the video content is reproduced; and
   (c) outputting one of the 2D video data generated in (a) and the 3D video data generated in (b) by referring to time information about the at least one part of the display section during which the video content is reproduced, which includes a value indicating the start of the at least one part and a value indicating length of the at least one part.

2. The video data decoding method of claim 1, further comprising:
   parsing a time information stream to generate the time information about the at least one part of the display section of the video content.

3. The video data decoding method of claim 2, wherein the time information includes a flag for switching a displayed dimension of the video content, a 2D display start point of the video content, and a 3D display start point of the video content.

4. The video data decoding method of claim 1, further comprising:
   (d) parsing a program information stream to generate program information about the at least one part of the display section of the video content; and
   (e) extracting the 3D video data from a transport stream by referring to the generated program information.

5. The video data decoding method of claim 1, wherein in (a), 2D video data for two-dimensionally displaying an entire display section of the video content is generated.

6. The video data decoding method of claim 1, wherein in (b), 2D video data for two-dimensionally displaying a remaining part of the display section of the video content except for the at least one part of the display section of the video content is generated.

7. A video data decoding method, comprising:
   (a) decoding a first video stream to generate 2D video data for two-dimensionally displaying video content;
   (b) decoding a second video stream to generate 3D video data for three-dimensionally displaying at least one part of the display section of the video content;
   (c) parsing a time information stream to generate time information about the at least one part of the display section of the video content; and
   (d) outputting one of the 2D video data generated in (a) and the 3D video data generated in (b) by referring to the generated time information,
   wherein the time information includes a flag for switching a displayed dimension of the video content, a 2D display start point of the video content, and a 3D display start point of the video content, and
   wherein the flag is a splicing_point_flag according to MPEG-2 and at least one of the 2D display start point and the 3D display start point is a splice_countdown according to MPEG-2.

8. A video data decoding method comprising:
   (a) decoding a first video stream to generate 2D video data for two-dimensionally displaying video content;
   (b) decoding a second video stream to generate 3D video data for three-dimensionally displaying at least one part of the display section of the video content;

(c) parsing a program information stream to generate program information about the at least one part of the display section of the video content; and
(d) extracting the 3D video data from a transport stream by referring to the generated program information,
wherein the program information includes a type of a program element of the at least one part of the display section of the video content, a program identification (ID) of packets corresponding to the 3D video data, and description information about the 3D video data.

9. A decoder comprising:
a first decoder decoding a first video stream to generate 2D video data for two-dimensionally displaying video content;
a second decoder decoding a second video stream to generate 3D video data for three-dimensionally displaying at least one part of the display section during which the video content is reproduced; and
output unit outputting one of the 2D video data generated in (a) and the 3D video data generated in (b) by referring to time information about the at least one part of the display section during which the video content is reproduced, which includes a value indicating the start of the at least one part and a value indicating length of the at least one part.

10. A non-transitory computer-readable recording medium having recorded thereon a program for implementing a video data decoding method on a computer, the video data decoding method comprising:
(a) decoding a first video stream to generate 2D video data for two-dimensionally displaying a display section of video content;
(b) decoding a second video stream to generate 3D video data for three-dimensionally displaying at least one part of the display section during which the video content is reproduced; and
(c) outputting one of the 2D video data generated in (a) and the 3D video data generated in (b) by referring to time information about the at least one part of the display section during which the video content is reproduced, which includes a value indicating the start of the at least one part and a value indicating length of the at least one part.

11. A video data encoding method comprising:
(a) encoding 2D video data for two-dimensionally displaying a display section of video content to generate a first video stream; and
(b) encoding 3D video data for three-dimensionally displaying at least one part of the display section during which the video content is reproduced to generate a second video stream,
wherein the at least one part of the display section is identified by time information about the at least one part of the display section during which the video content is reproduced, which includes a value indicating the start of the at least one part and a value indicating length of the at least one part.

12. The video data encoding method of claim 11, further comprising (c) generating a time information stream indicating the time information about the at least one part of the display section of the video content.

13. The video data encoding method of claim 12, wherein the time information includes a flag for switching a displayed dimension of the video content, a 2D display start point of the video content, and a 3D display start point of the video content.

14. The video data encoding method of claim 11, further comprising (c) generating a program information stream indicating program information about the at least one part of the display section of the video content.

15. The video data encoding method of claim 11, wherein in (a), 2D video data for two-dimensionally displaying an entire display section of the video content is encoded.

16. The video data encoding method of claim 11, wherein in (b), 2D video data for two-dimensionally displaying the remaining part of the display section of the video content except for the at least one part of the display section of the video content is encoded.

17. A video data encoding method, comprising:
(a) encoding 2D video data for two-dimensionally displaying a display section of video content to generate a first video stream;
(b) encoding 3D video data for three-dimensionally displaying at least one part of the display section of the video content to generate a second video stream; and
(c) generating a time information stream indicating time information about the at least one part of the display section of the video content,
wherein the time information includes a flag for switching a displayed dimension of the video content, a 2D display start point of the video content, and a 3D display start point of the video content, and
wherein the flag is a splicing_point_flag according to MPEG-2 and at least one of the 2D display start point and the 3D display start point is a splice_countdown according to MPEG-2.

18. A video data encoding method, comprising:
(a) encoding 2D video data for two-dimensionally displaying a display section of video content to generate a first video stream;
(b) encoding 3D video data for three-dimensionally displaying at least one part of the display section of the video content to generate a second video stream; and
(c) generating a program information stream indicating program information about the at least one part of the display section of the video content,
wherein the program information includes a type of a program element of the at least one part of the display section of the video content, a program identification (ID) of packets corresponding to the 3D video data, and description information about the 3D video data.

19. An encoder comprising:
a first encoder encoding 2D video data for two-dimensionally displaying a display section of video content to generate a first video stream; and
a second encoder encoding 3D video data for three-dimensionally displaying at least one part of the display section during which the video content is reproduced to generate a second video stream,
wherein the at least one part of the display section is identified by time information about the at least one part of the display section during which the video content is reproduced, which includes a value indicating the start of the at least one part and a value indicating length of the at least one part.

20. A non-transitory computer-readable recording medium having recorded thereon a program for implementing a video data encoding method on a computer, the video data encoding method comprising:
(a) encoding 2D video data for two-dimensionally displaying a display section of video content to generate a first video stream; and (b) encoding 3D video data for three-dimensionally displaying at least one part of the display section during which the video content is reproduced to generate a second video stream,
wherein the at least one part of the display section is identified by time information about the at least one part of the display section during which the video content is reproduced, which includes a value indicating the start of the at least one part and a value indicating length of the at least one part.

* * * * *